US010472524B2

(12) United States Patent
Pedoni et al.

(10) Patent No.: US 10,472,524 B2
(45) Date of Patent: Nov. 12, 2019

(54) BINDER COMPOSITION, A METHOD OF MANUFACTURING A CORROSION-RESISTANT SACRIFICIAL PROTECTIVE COATING USING SAID COMPOSITION, AND A SUPPORT COATED WITH SUCH A COATING

(71) Applicant: A ET A MADER, Lille (FR)

(72) Inventors: Emeline Pedoni, Taverny (FR); Polina Volovitch, Palaiseau (FR); Kevin Ogle, Saint Germain En Laye (FR)

(73) Assignee: A ET A MADER, Lille (FR)

( * ) Notice: Subject to any disclaimer, the term of this patent is extended or adjusted under 35 U.S.C. 154(b) by 278 days.

(21) Appl. No.: 15/475,187

(22) Filed: Mar. 31, 2017

(65) Prior Publication Data

US 2017/0204275 A1  Jul. 20, 2017

Related U.S. Application Data

(62) Division of application No. 14/332,409, filed on Jul. 16, 2014, now Pat. No. 9,644,102.

(30) Foreign Application Priority Data

May 23, 2014 (FR) .................................. 14 54706

(51) Int. Cl.
| | | |
|---|---|---|
| *C09D 5/08* | (2006.01) | |
| *B05D 3/00* | (2006.01) | |
| *C04B 28/34* | (2006.01) | |
| *C09D 5/12* | (2006.01) | |
| *C09D 183/04* | (2006.01) | |
| *C08G 77/22* | (2006.01) | |
| *C23C 22/74* | (2006.01) | |
| *C23C 22/83* | (2006.01) | |
| *C09D 183/16* | (2006.01) | |
| *B05D 1/02* | (2006.01) | |
| *B05D 3/02* | (2006.01) | |
| *C23F 11/04* | (2006.01) | |
| *C23F 11/18* | (2006.01) | |
| *C08K 3/32* | (2006.01) | |
| *C08K 3/22* | (2006.01) | |
| *C08K 3/014* | (2018.01) | |
| *C08G 77/60* | (2006.01) | |
| *C04B 111/10* | (2006.01) | |
| *C04B 111/20* | (2006.01) | |

(52) U.S. Cl.
CPC .............. *C09D 5/084* (2013.01); *B05D 1/02* (2013.01); *B05D 3/007* (2013.01); *B05D 3/0254* (2013.01); *C04B 28/34* (2013.01); *C04B 28/348* (2013.01); *C08G 77/22* (2013.01); *C09D 5/12* (2013.01); *C09D 183/04* (2013.01); *C09D 183/16* (2013.01); *C23C 22/74* (2013.01); *C23C 22/83* (2013.01); *C23F 11/04* (2013.01); *C23F 11/188* (2013.01); *C04B 2111/10* (2013.01); *C04B 2111/1075* (2013.01); *C04B 2111/20* (2013.01); *C08G 77/60* (2013.01); *C08K 3/014* (2018.01); *C08K 3/22* (2013.01); *C08K 3/32* (2013.01); *C23C 2222/20* (2013.01); *Y10T 428/31663* (2015.04)

(58) Field of Classification Search
CPC ...... B05D 3/007; B05D 3/0254; C09D 5/084; C09D 183/04; C09D 183/16; C23C 22/74; C23F 11/188; C04B 28/34
USPC ......................................................... 428/447
See application file for complete search history.

(56) References Cited

U.S. PATENT DOCUMENTS

| | | | |
|---|---|---|---|
| 4,098,749 A | 7/1978 | Hoshino | |
| 5,037,478 A * | 8/1991 | Okai | C09C 1/00 |
| | | | 106/14.05 |
| 6,224,657 B1 | 5/2001 | Myers et al. | |
| 7,081,157 B2 | 7/2006 | Maze | |
| 2006/0225613 A1* | 10/2006 | Lejeune | C08G 77/14 |
| | | | 106/287.16 |
| 2009/0120629 A1 | 5/2009 | Ashe | |
| 2011/0008645 A1* | 1/2011 | Schneider | C23C 22/17 |
| | | | 428/640 |
| 2011/0041027 A1 | 2/2011 | Fong et al. | |
| 2013/0177768 A1 | 7/2013 | Krüger et al. | |
| 2013/0234070 A1 | 9/2013 | Mowrer | |
| 2015/0284854 A1 | 10/2015 | Özlem Özcan et al. | |

FOREIGN PATENT DOCUMENTS

| | | |
|---|---|---|
| EP | 1191074 A1 | 3/2002 |
| EP | 1975207 A1 | 10/2008 |
| EP | 2500377 A2 | 9/2012 |
| GB | 1528715 A | 10/1978 |
| WO | WO 2007/025297 A2 | 3/2007 |
| WO | WO 2008/027679 A1 | 3/2008 |
| WO | WO 2009/120629 A1 | 10/2009 |
| WO | WO 2011/041027 A1 | 4/2011 |

(Continued)

OTHER PUBLICATIONS

International Search Report for PCT/FR2015/051358, dated Sep. 2, 2015 (6 pages).

*Primary Examiner* — Doris L Lee
(74) *Attorney, Agent, or Firm* — Bookoff McAndrews, PLLC

(57) ABSTRACT

The present disclosure provides an aqueous binder composition for forming a sacrificial corrosion-protective coating, said composition being free of chromates and also preferably free of borates and molybdates. Said binder composition advantageously has a pH of less than 6 and comprises a binder, particles of at least one metal oxide and at least one metallic phosphate, said binder comprising a hydrolyzed organosilane oligomer. In addition, the proportion by weight of said particles of at least one metal oxide relative to the total dry weight of said binder composition is greater than or equal to 75%.

19 Claims, No Drawings

(56) References Cited

FOREIGN PATENT DOCUMENTS

| WO | WO 2011/060050 A1 | 5/2011 |
| WO | WO 2012/051373 A2 | 4/2012 |
| WO | WO 2012/051573 A2 | 4/2012 |
| WO | WO 2013/064260 A1 | 5/2013 |
| WO | WO 2014/076105 A2 | 5/2014 |

\* cited by examiner

BINDER COMPOSITION, A METHOD OF MANUFACTURING A CORROSION-RESISTANT SACRIFICIAL PROTECTIVE COATING USING SAID COMPOSITION, AND A SUPPORT COATED WITH SUCH A COATING

The present application is a Divisional application of U.S. patent application Ser. No. 14/332,409, the entire contents of which are herein incorporated by reference.

The present disclosure relates to aqueous binder compositions for forming a sacrificial corrosion-resistant protective coating on at least one surface portion of a support, which compositions are in particular free of carcinogenic, mutagenic, or reprotoxic compounds also known by the abbreviation CMR compounds.

BACKGROUND OF THE DISCLOSURE

The present disclosure also relates to methods of manufacturing and applying sacrificial protective coatings of this type, and to supports coated thereby.

Conversion treatments lead to a superficial modification of the metallic support (alloys of aluminum, titanium, iron and other metals) by an anodizing process (electrolysis operation, for example chromic, sulfuric, or phosphoric anodic oxidation) or by a simple chemical conversion process (for example chromating or phosphating).

Chromating can be used to form a thin, highly adhesive deposit of metallic chromates by bringing the surface of the part to be treated (typically aluminum or zinc alloys or steels) into contact with an acidic solution based on dichromates and fluorinated activating agents. That treatment improves the corrosion resistance of the support and is also used as a keying base for paints.

However, such processes suffer from the disadvantage of using toxic compounds, particularly as regards the excess treatment and washing water used for the treated supports.

Further, the washing water and solutions employed need to be treated to eliminate the heavy dissolved CMR metals before discharging them or reusing them. Eliminating metals produces additional toxic waste, which is difficult to purify and to treat.

A support, in particular a support including iron and constituting a sub-assembly or a component of aircraft equipment, can be provided with sacrificial protection against corrosion, in particular against red rust corrosion, by applying a moist single- or two-component binder composition containing a solvent or dilutable in water, but that suffers from numerous constraints. Single-component compositions must be re-dispersed at least 24 hours (h) before they are used. Once such binder compositions have been applied to the support that is to be functionalized, possibly after a first evaporation step, it is necessary to carry out a first cure, then to allow the support to cool down, and then to carry out a second cure, known as an anneal, for several hours. A third cure or final cure might be necessary and could last 5 h.

Using such compositions also necessitates intermediate compacting when intermediate annealing is carried out. That operation consists in spraying particles such as corundum particles onto the portion of the surface of the support to be functionalized, at a pressure that is from 100 kilopascals (kPa) to 150 kPa, the dimensions of said particles being in the range 90-180 US mesh. A compacting operation known as final compacting, which is thus different from the intermediate operation in terms of pressure (kPa) and dimensions of the projected particles, is also carried out in order to finish the coating.

Binder compositions of that type also suffer from the major disadvantage of including trivalent and/or hexavalent chromates as well as borates.

In operation, binder compositions of that type are combined with a sacrificial metallic pigmentation, in particular of aluminum or of magnesium, these latter being associated with the chromium III or VI components and acting to inhibit corrosion and to passivate the support, as well as acting as the above-mentioned metal pigmentation.

Sacrificial performance, and thus corrosion resistance, can only be obtained after performing the above-mentioned treatment operations of annealing and of compacting, which operations are awkward and can be carried out with any guarantee of success only by qualified, certified operators.

EP 0 995 816 A1 is known, and discloses a binder composition comprising, in the aqueous phase, phosphate ions and chromium III ions and secondary cationic species such as aluminum ions, zinc ions, or indeed magnesium ions to which metal oxide particles are also added.

That binder composition does away with the use of hexavalent chromium, but still employs chromium III ions.

In addition, US 2006/0225613 is known, which describes the synthesis of an epoxysilane oligomer that is said to present good stability and good dispersion in an aqueous medium despite its high molecular weight. Said organosilane oligomer is mixed with metallic particles the quantity of which must not exceed 35% by weight of the total binder composition weight so that the film obtained retains its good appearance (see [0046]). The binder composition examples (4 to 18 and 21) for which the corrosion properties were tested comprise 28% by weight of zinc oxide and 3% of aluminum oxide. There is no indication as to the appearance of the films obtained. In all of those examples, the binder composition is dried at 70° C. for 20 minutes (min) then dried at 300° C. for 30 min in order to polymerize the organosilane oligomer and form the film of corrosion-protective paint. The corrosion resistance test consists in bringing the substrate coated with a film corrosion-protective paint into contact with a saline solution at a temperature of 35° C. as defined in accordance with ISO standard 7253:1984. The measured value corresponds to the time after which 5% of red rust compared with the total weight of the coating appears when the substrate coated with the film of corrosion-resistant paint is placed in a stove at 35° C. The red rust corresponds to oxidation of iron contained in the support to be protected against corrosion, which means that said salt spray passes through the film of corrosion-resistant paint, which no longer protects the substrate. The above-mentioned standard, which has been updated and now corresponds to ISO standard 9277-2012, defines the type of salt spray, but it does not define the specifications to be complied with as regards corrosion, nor does it define in precise terms the time for application of said salt spray. In US 2006/0225613, after only a few hours, 5% of red rust relative to the total weight of the coating has already been formed. A sacrificial corrosion-protective coating should allow red rust to appear only after a few hundred hours, or even more than 1000 h. Thus, US 2006/0225613 concerns a binder composition for the manufacture of a film of corrosion-resistant paint that is not suitable for the manufacture of a corrosion-protective coating that is sacrificial and that is thus intended to resist extreme corrosive conditions such as several salt spray cycles, each cycle lasting more than 15 h and comprising a period during which the coating is exposed to temperatures greater than or equal to 250° C. for several hours.

OBJECT AND SUMMARY OF THE DISCLOSURE

The present disclosure provides an aqueous binder composition for the manufacture of a sacrificial corrosion-protective coating, in particular a primer, having the following properties:
good adhesion to the support, and with primers and paints that are subsequently applied as a top coat;
good corrosion resistance, in particular sacrificial corrosion resistance when exposed to a salt spray as defined in French standard NF EN ISO 9227-2012;
good resistance to scratches, chemical products and wear;
an electrical surfactant resistivity of 1 ohm/square or less.

The present disclosure also provides a kit for an aqueous binder composition that can function without carcinogenic, mutagenic, or reprotoxic compounds, and in particular is free of molybdates and/or chromates and/or borates or heavy metals.

The present disclosure also provides a method of manufacturing a sacrificial corrosion-protective coating that is easy to prepare and does not require intermediate annealing and compacting operations in order to obtain a coating that may have a final thickness of 90 micrometers (μm).

Thus, in a first aspect, the present disclosure provides an aqueous binder composition for the manufacture of a sacrificial corrosion-protective coating, said composition preferably being free of chromates and also preferably free of borates and molybdates. Said binder composition has a pH of less than 6 and comprises a binder, particles of at least one metal oxide, and at least one metallic phosphate, said binder comprising a hydrolyzed organosilane oligomer. In addition, the proportion by weight of said particles of at least one metal oxide relative to the total dry weight of said aqueous binder composition is greater than or equal to 75%.

It has been discovered that the combination of a majority of metallic particles in an aqueous binder composition combined with at least one metallic phosphate and an organosilane oligomer means that a sacrificial corrosion-protective coating can be formed with excellent salt spray corrosion resistance properties, even when it is exposed to cycles at temperature greater than or equal to 250° C., while retaining a coating with an appearance that is regular without the formation of blisters or other irregularities.

When the binder composition does not include at least one metallic phosphate, the sacrificial corrosion-protective coating obtained forms blisters after approximately five complete salt spray resistance cycles and at temperatures of approximately 450° C., each complete cycle lasting 24 h and comprising a first cycle during which the coating is exposed to a temperature of 450° C. for 6 h, followed by a second cycle during which said coating is left at ambient temperature, then a third cycle during which said protective coating is exposed to a salt spray for 16 h as defined in ISO standard 9227-2012, and finally a fourth cycle identical to the above-mentioned third cycle.

Without wishing to be limited to any one scientific theory, a non-exhaustive explanation would be that the sacrificial protective coating lacks a barrier effect as regards the diffusion of oxygen and moisture. Once introduced into the sacrificial protective coating, oxygen and moisture are suspected of generating corrosion of the iron by said hot coating in the furnace at 450° C., especially when exposed to salt spray.

Adding at least one metallic phosphate improves the barrier effect of the sacrificial protective coating, in particular by densifying the matrix between the metallic particles by means of very good affinity with the organosilane oligomer. Furthermore, it has also been observed that the behavior of the sacrificial protective coating in the presence of at least one metallic phosphate is more reproducible in terms of electrochemical activity, even for different coating thicknesses (for example 25 μm or 50 μm), compared with when the binder composition does not include at least one metallic phosphate.

In the context of the present disclosure, the term "dry matter of the aqueous binder composition", optionally of the part A and/or the part B as described below, means the residual dry matter once the volatile compound or compounds has/have evaporated off, in particular those with a boiling point less than or equal to 100° C., in particular water. Preferably, the residual dry matter corresponds to the mass in grams (g) of aqueous binder composition from which the quantity of water it contains also in grams has been subtracted.

Preferably, part B described below does not include water or a volatile compound, and so the dry matter of part B corresponds to the total weight of part B.

Preferably, the particles of metal oxide(s) is/are selected so that their galvanic potential(s) millivolts (mV) is/are lower than the galvanic potential of the metallic surface(s) to be coated. The galvanic potential can be measured by immersing two different metallic materials in a saline solution at a predetermined temperature, for example at approximately 25° C., then measuring the potential difference (mV) obtained between said two materials. Thus, the metal oxide particles need to be based on one or more metals that is/are less noble than the metal or metallic alloy of the support to be coated. In the context of the present disclosure, the term "metallic phosphate" means any compound including a neutral phosphate ion, such as phosphate $PO_4^{3-}$, tripolyphosphate $(P_3O_{10}^{5-})$, or hexametaphosphate $(P_6O_8^{6-})$, together with one or more metal(s), said metal(s) in particular being selected from zinc, aluminum, manganese, or a mixture thereof. Preferably, the percentage values indicated in the present text are given to within ±5% concerning the weight of the various components. Preferably, the values concerning the electrical surface resistivity given in the present text are given to within ±10%, more preferably to within ±5%.

In a variation, said at least one metallic phosphate is selected from the group constituted by zinc phosphate $(Zn_3(PO_4)_2)$, manganese phosphate, $(Mn_3(PO_4)_2)$, aluminum phosphate $(AlPO_4)$, aluminum tripolyphosphate $(Al_5(P_3O_{10})_3)$, aluminum and zinc phosphate, and mixtures thereof, preferably from the group constituted by zinc phosphate and aluminum tri polyphosphate.

In one embodiment, the proportion by weight of at least one metallic phosphate is more than 0 and less than or equal to 15% relative to the total dry weight of said aqueous binder composition, preferably less than or equal to 10%, more preferably less than or equal to 8%, in particular greater than or equal to 3%, relative to the total dry weight of said aqueous binder composition.

In a variation, said at least one metal oxide particle is selected from the group constituted by aluminum oxide, zinc oxide, a mixed zinc-magnesium oxide, a mixed aluminum-zinc oxide, and mixtures thereof, preferably from the group constituted by aluminum oxide and a mixed aluminum-zinc oxide.

The mixed aluminum-zinc oxide primarily comprises aluminum by weight, preferably at least approximately ⅔ aluminum for at most ⅓ zinc by weight.

In a variation, the proportion by weight of particles of at least one metal oxide is greater than or equal to 80%, preferably greater than or equal to 85%, relative to the total dry weight of said aqueous binder composition.

In a variation, said organosilane oligomer has the following formula (I), $[R_4\text{—}(SiR_1R_2R_3)]_n$, in which $\underline{n}$ is an integer with $2 \le n \le 100$ and $R_4$ is a non-hydrolyzable group and at least one group from $R_1$, $R_2$, and $R_3$ is a hydrolyzable group.

Preferably, $2 \le n \le 75$; more preferably $2 \le n \le 50$; $2 \le n \le 40$; in particular $2 \le n \le 25$; and especially, $2 \le n \le 15$.

The term "hydrolyzable group" means any group that is capable of separating from the silicon atom under the effect of water decomposing to generate $H_3O^+$ and $OH^-$ ions, in particular under the effect of $H_3O^+$ ions in the context of the present disclosure, since the pH of the aqueous binder composition is less than 6.

The hydrolyzed organosilane (I) forms a silanol equivalent and an alcohol during the first hydrolysis reaction. The organosilane with formula (I) then reacts with the silanol formed and the silanols formed react with each other during second condensation reactions to form polysiloxane oligomers or polymers, i.e. containing —Si—O—Si— bridges.

The silanols also react with the metal oxide particles to graft them, in particular with the hydroxyl functions supported on the surface of said particles.

Preferably, said organosilane oligomer is selected from an organodialkoxysilane oligomer or an organotrialkoxysilane oligomer, more preferably from an epoxy dialkoxysilane or an epoxytrialkoxysilane or a vinyldialkoxysilane or a vinyltrialkoxysilane.

The organosilane oligomer according to embodiments of the present disclosure comprises a non-hydrolyzable group $R_4$ and at least one hydrolyzable group selected from $R_1$, $R_2$ or $R_3$, which groups, independently of each other, are either in the structure per se, i.e. in the carbon chain, of the organosilane oligomer, for example at the end of the chain, or are branches attached to said chain at regular intervals.

In a variation, $R_4$ and optionally $R_1$ and/or $R_2$ and/or $R_3$ when it/they represent(s) one or more non-hydrolyzable groups independently of each other, represent a group selected from: a $C_1$-$C_{20}$ alkyl group or $C_3$-$C_{10}$ cycloalkyl group substituted with one or more epoxy group(s), said epoxy group being mono, di, tri, or tetravalent; a glycidoxy group; a $C_1$-$C_{20}$ alkyl group substituted with a glycidoxy group; a vinyl group ($CH_2$=$CH$—); a $C_1$-$C_{20}$ alkyl group substituted with a vinyl group ($CH_2$=$CH$—); a $C_1$-$C_{20}$ alkyl group substituted with a primary amine and/or a secondary amine and/or a tertiary amine; a primary amine; a secondary amine; a tertiary amine; a $C_1$-$C_{20}$ alkyl group substituted with a thiol group; a thiol group; a urea group; a $C_1$-$C_{20}$ alkyl group substituted with a urea group; an isocyanate group; and a $C_1$-$C_{20}$ alkyl group substituted with an isocyanate group.

Further, at least one group selected from $R_1$, $R_2$, and $R_3$ presents as its hydrolyzable group: a $C_1$-$C_{10}$ alkoxy group; a $C_3$-$C_{10}$ cycloalkyloxy group; a $C_5$-$C_{10}$ aryloxy group or a $C_1$-$C_5$ acyloxy group.

Said above-mentioned alkyl groups, whether for the hydrolyzable group or the non-hydrolyzable group, are $C_1$-$C_{20}$, preferably $C_1$-$C_{15}$, more preferably $C_1$-$C_{10}$, which are saturated, linear, or branched, and the cycloalkyl groups are saturated, preferably $C_3$-$C_6$.

In the context of the present disclosure, when a group is said to be $C_n$-$C_p$ (also termed $C_n$ to $C_p$), this means that it has $\underline{n}$ to $\underline{p}$ carbon atoms, $\underline{n}$ and $\underline{p}$ being integers.

Examples of monovalent epoxy groups are the glycidoxy group, —O—$CH_2$—$C_2H_3O$, or the R—$C_2H_3O$ (or Ri-oxirane) group in which $R_i$ is a linear or branched alkyl chain, which may optionally be saturated, a cycloalkyl, an alkenyl, an aryl, an ether, or a polyether. The above-mentioned alkyl chains are preferably $C_1$ to $C_{10}$, and the above-mentioned cycloalkyls are preferably $C_3$ to $C_{10}$, more preferably $C_3$ to $C_6$.

Examples of the divalent epoxy groups are as follows: —(—)C(—O—)$CR_{ii}R_{iii}$ and —$CR_{ii}$(—O—)$CR_{iii}$—; examples of trivalent epoxy groups are as follows: —(—)C(—O—)$CR_{ii}$; examples of tetravalent epoxy groups are as follows: —(—)C(—O—)C(—), in which $R_{ii}$ and $R_{iii}$, independently of each other, are a structure selected from those listed above for $R_i$.

Preferably, the quantity of epoxy function of the oligomer with formula (I), i.e. with an oxirane function, is less than or equal to 15 millimoles per gram (mmoles/g) of organosilane oligomer, preferably less than or equal to 10 mmoles/g of organosilane oligomer, and more preferably less than or equal to 4.75 mmoles/g of organosilane oligomer.

In the context of the present disclosure, the term "alkoxy group" means any group with formula $R_a$—O in which $R_a$ represents a linear or branched saturated alkyl group optionally including an —OH function, preferably $C_1$ to $C_{10}$, more preferably $C_1$ to $C_6$, still more preferably $C_1$ to $C_4$, examples of which are the methoxy, ethoxy, isopropoxy, n-propoxy, propoxy, n-butoxy, i-butoxy, sec-butoxy, tert-butoxy, n-pentoxy, and n-hexyloxy groups.

In the context of the present disclosure, the term "cycloalkyloxy group" means any group with formula $R_b$—O in which $R_b$ represents a cycloalkyl group, preferably $C_3$ to $C_{10}$, such as the cyclopropyloxy or cyclohexyloxy groups.

In the context of the present disclosure, the term "cycloalkyl group" means any cyclic alkyl group, preferably $C_3$ to $C_{10}$, for example the cyclohexyl or cyclopropyl group.

In the context of the present disclosure, the term "aryloxy group" means any group with formula $R_c$—O in which $R_c$ represents an aryl group, preferably $C_5$ to $C_{10}$, such as the phenoxy group, for example.

In the context of the present disclosure, the term "aryl group" means one or more aromatic rings advantageously containing 5 to 10 carbon atoms, which may be coupled or fused. In particular, the aryl groups may be monocyclic or bicyclic groups, preferably the phenyl group.

In the context of the present disclosure, the term "acyloxy group" means any group with formula $R_d$—CO—O in which $R_d$ represents a saturated linear or branched alkyl group, preferably $C_1$ to $C_4$, such as acetoxy or propionyloxy groups.

Alkoxy groups, in particular the methoxy, ethoxy, and isopropoxy groups, are preferred hydrolyzable groups.

In the context of the present disclosure, the term "primary amine" means any group with formula $R_eNH_2$, the term "secondary amine" means any group with formula $R_eR_fNH$, and the term "tertiary amine" means any group with formula $R_eR_fR_gN$, in which $R_e$, $R_f$ and $R_g$ are linear or branched alkyl groups, which may optionally be saturated, preferably $C_1$ to $C_{20}$, or more preferably $C_1$ to $C_{10}$, and still more preferably $C_1$ to $C_4$.

In the context of the present disclosure, the term "thiol group" means any group with formula $R_h$—SH in which $R_h$ is a linear or branched alkyl group, which may optionally be saturated, preferably $C_1$ to $C_{20}$, more preferably $C_1$ to $C_{10}$, and still more preferably $C_1$ to $C_4$.

In the context of the present disclosure, the term "urea group" means any group with formula $(R_i,R_j)N$—$C(=O)$—$N(R_k,R_l)$ in which $R_i$, $R_j$, $R_k$ and $R_l$, independently of one another, are a hydrogen atom or a linear or branched alkyl group, which may optionally be saturated, preferably $C_1$ to $C_{20}$, more preferably $C_1$ to $C_{10}$, and still more preferably $C_1$ to $C_4$.

In the context of the present disclosure, the term "isocyanate group" means any group with formula $R_m$—N=C=O, in which $R_m$ is a hydrogen atom or a linear or branched alkyl group, which may optionally be saturated, preferably $C_1$ to $C_{20}$, more preferably $C_1$ to $C_{10}$, and still more preferably $C_1$ to $C_4$.

In the context of the present disclosure, the term "alkenyl group" means any group with formula $R_o R_p C = CR_r R_s$ in which $R_o$, $R_p$, $R_r$, $R_s$ $R_t$, independently of one another, are a hydrogen atom or a linear or branched alkyl chain, which may optionally be saturated, preferably $C_1$ to $C_{20}$, more preferably $C_1$ to $C_{10}$, and still more preferably $C_1$ to $C_4$, such as a vinyl group, for example.

In a variation, $R_1$ and/or $R_2$ and/or $R_3$, preferably $R_1$ and $R_2$, $R_2$ and $R_3$ or $R_1$ and $R_3$, more preferably $R_1$, $R_2$ and $R_3$, represent an alkoxy group, a cycloalkoxy group, an aryloxy group or an acyloxy group, preferably a $C_1$-$C_6$ alkoxy group.

In a variation, $R_4$ is an alkyl group substituted with an epoxy group, preferably glycidoxy, with formula X—Y— attached to the silicon atom, in which X is a glycidoxy group, —O—$CH_2$—$C_2H_3O$; or oxirane; and Y is a group selected from: —$(CH_2)_n$—, with $1 \leq n \leq 12$, more preferably with $1 \leq n \leq 6$; and a group comprising a $C_3$-$C_6$ cycloalkyl group.

In a variation, the alkoxy group is selected from the following groups: methoxy, ethoxy, propoxy, isopropoxy, isobutoxy, acetoxy, methoxyethoxy, monovalent alkoxy groups derived from diols comprising an alcohol and an alkoxy group selected from —O—$CH_2CH_2$—OH, such as ethyleneglycol; propyleneglycol; neopentyl glycol; 1,3-propanediol; 2-methyl-1,3-propanediol; 1,3-butanediol; 2-methyl-2,4-pentanediol; 1,4-butanediol; cyclohexane dimethanol; or picanol, preferably from the groups methoxy; ethoxy; propoxy; and isopropoxy.

In a variation, the motif $R_4$—$(SiR_1R_2R_3)$ of the organosilane oligomer with formula (I) is selected from a list (IIa): gamma-glycidoxypropyltrimethoxysilane; gamma-glycidoxypropyltriethoxysilane; gamma-glycidoxypropyl methyldi methoxysilane; and gam ma-glycidoxypropylmethyldiethoxysilane; and from a list (IIb): beta-(3,4-epoxycyclohexyl)-ethyl trimethoxysiloxane; beta-(3,4-epoxycyclohexyl)-ethyl methyl dimethoxysilane, beta-(3,4-epoxycyclohexyl)-ethyl methyl diethoxysilane; and beta-(3,4-epoxycyclohexyl)-ethyl triethoxysilane, preferably from list (IIa).

Preferably, the general formula for the organosilane oligomer compound according to embodiments of the present disclosure is $(C_xH_yO_zSi)_n$ with $4 \leq x \leq 20$, more preferably $x \leq 15$, and more preferably $x \leq 10$, with $15 \leq y \leq 30$, and $z \geq 2$, more preferably $z \geq 4$, and more preferably $z \geq 6$, $\underline{n}$ being an integer with $2 \leq n \leq 100$.

The choice of organosilane oligomer is important so that a film can be formed on the support to be protected in which the metal oxide particles interact with the silicon atoms and form an organized matrix once the components based on carbon and oxygen have been destroyed by heating as is described below.

In a variation, the hydrolyzed organosilane oligomer represents in the range 5% to 30% by weight of the total dry weight of said aqueous binder composition, preferably in the range 5% to 15% by weight of the total dry weight of said aqueous composition, more preferably in the range 5% to 10% by weight of the total weight of said aqueous binder composition.

In a variation, the aqueous binder composition comprises an acidic catalyst selected from the group constituted by p-toluene sulfonic acid, phosphoric acid, boric acid, acetic acid, and mixtures thereof, preferably from the group constituted by p-toluene sulfonic acid, acetic acid and phosphoric acid; more preferably, the catalyst is p-toluene sulfonic acid.

This catalyst can be used to initiate the polymerization reaction by self-condensation, which is activated by heating, in particular during drying (iii) and especially during the intermediate (v) or final (vi) annealing step, which are described below.

Preferably, the ratio of the number of moles/liter of acidic catalyst to that of the organosilane compound with formula (I) is in the range 1/60 to 1/5, more preferably in the range 1/40 to 1/20.

In a variation, the particles of at least one metal oxide have a granulometric distribution for 10% to 90% by weight of said particles in the range 2 μm to 30 μm; preferably, said particles are spherical.

The grain size is measured by the dry or wet method using a laser granulometer such as that marketed by MALVERN, for example the MASTERSIZER 3000® or 2000®.

In a second aspect, the present disclosure provides a kit for an aqueous binder composition in accordance with any one of the preceding embodiments, said kit comprising a part A having a pH of less than 6 constituted by an aqueous composition comprising a hydrolyzed organosilane oligomer and a part B comprising particles of at least one metal oxide and at least one metallic phosphate, the proportion by weight of particles of at least one metal oxide relative to the total dry weight of parts A and B added together being greater than or equal to 75%.

Preferably, the proportion by weight of the particles of said at least one metal oxide relative to the total dry weight of part B and the proportion by weight of the dry matter of part B relative to the total dry weight of part A are determined such that the proportion by weight of particles of at least one metal oxide relative to the total dry weight of parts A and B added together is greater than or equal to 75%.

The hydrolyzed organosilane oligomer of part A corresponds to the organosilane oligomer described above, in particular to that with formula (I) described above and in accordance with all of the embodiments described above with reference to the first aspect.

The particles of at least one metal oxide for any one of the variant embodiments described above are in accordance with the first aspect.

Said at least one metallic phosphate for any one of the variant embodiments described above are in accordance with the first aspect.

In a variation, the organosilane oligomer hydrolyzate represents in the range 5% to 50% by weight, preferably in the range 5% to 30% by weight relative to the total dry weight of part A.

In a third aspect, the present disclosure also provides the use of the aqueous binder composition in accordance with any one of the variant embodiments described or of the kit as described above to form a sacrificial corrosion-protective coating on at least a portion of the surface of a support, in particular a support formed from a material selected from metals, metal alloys and composite materials comprising a metal or a metal alloy, preferably with an electrical surface resistivity of less than 1 ohm/square.

Advantageously, said surface portion of the support has a galvanic potential (mV) that is higher than the galvanic potential (mV) of the metallic particles that comprise said coating.

In general, said support is any metallic element that is exposed to severe wear conditions, for example: an engine or generator turbine shaft, an axle on road or railroad rolling stock, a power or motion transmission shaft, wind turbine ball bearings, a metal part for offshore construction, or a particular element for an aircraft.

Preferably, said sacrificial protective coating has an electrical surface resistivity of less than 1 ohm/square.

The resistivity indicated above corresponds to the indicated surface resistivity when the thickness of the coating for which the resistivity is being measured is considered to be negligible.

Preferably, the sacrificial corrosion-protective coating according to embodiments of the present disclosure has a thickness greater than or equal to 20 μm and less than or equal to 120 μm, more preferably greater than or equal to 40 μm, more particularly less than or equal to 90 μm, in particular less than or equal to 60 μm, in the dry state, in particular after the final annealing step and/or the final compacting step.

In accordance with a fourth aspect, the present disclosure provides a method of manufacturing and applying a sacrificial corrosion-protective coating to at least one surface portion of a support using the aqueous binder composition described in accordance with any one of the preceding variant embodiments, comprising the following steps in succession:

(i) a step of supplying and preparing at least one surface portion of a support formed from metal or a metal alloy;

(ii) a step of applying the aqueous binder composition according to any one of the preceding variant embodiments in order to form a moist layer of film on at least said surface portion;

(iii) a drying step to evaporate the water and allow a film to be formed at a temperature in the range 60° C. to 90° C. for at least 5 min;

(iv) optionally, repeating steps (ii) and (iii) until a film with a predetermined thickness is obtained;

(v) optionally, after each drying step (iii) with the exception of the last drying step (iii), a step of intermediate annealing and/or a step of intermediate compacting of the film is/are applied;

(vi) a final step of annealing said film obtained at the end of step (iii) at a temperature greater than or equal to 250° C. for at least 30 min;

(vii) a step of final compacting of said at least one surface portion coated with said sacrificial corrosion-protective film so as to form a sacrificial corrosion-protective coating, preferably with an electrical surface resistivity of less than 1 ohm/square.

Advantageously, the compacting step acts to work harden the sacrificial corrosion-protective coating.

The final annealing step (vi) and the final compacting step (vii) are carried out on the film after the last drying step (iii) applied to said film, and so an intermediate annealing step or an intermediate compacting step are not carried out, as they would be redundant in the light of the corresponding final steps.

Preferably, each compacting step, whether it is intermediate or final, comprises blasting a powder such as corundum ($Al_2O_3$) of grain size that is preferably in the range 80 to 200 US mesh, more preferably in the range 80 to 180 US mesh, at a pressure greater than or equal to 100 kPa, preferably greater than or equal to 200 kPa.

It has been discovered that the combination of an aqueous binder composition mainly comprising particles of at least one metal oxide in the presence of at least one metallic phosphate, and a hydrolyzed organosilane oligomer undergoing an appropriate final annealing step combined with a final compacting step can be used to form a sacrificial corrosion-protective coating with an electrical surface resistivity of less than 1 ohm/square, and has excellent corrosion resistance over time and at high temperatures without using chromates, molybdates, or even borates, and while preserving a good appearance.

Advantageously, an intermediate annealing step and/or an intermediate compacting step is/are not essential in order to form a sacrificial corrosion-protective coating that is satisfactory compared with the prior art. In fact, using a binder composition in accordance with embodiments of the present disclosure means that steps (ii) and (iii) can be carried out in succession as many times as is necessary to obtain a moist film with the desired thickness, then a final annealing step followed by a final compacting step can be carried out directly without having to carry out an intermediate annealing and/or intermediate compacting.

Advantageously, it is possible to deposit the layer of binder composition according to embodiments of the present disclosure in a single layer of moist film with a thickness that may be up to 140 μm, which corresponds to a finished and thus dry sacrificial protective coating of the order of 90 μm. In the prior art, it is necessary to apply several layers of binder compositions then to dry them and possibly to carry out intermediate annealing steps and/or intermediate compacting steps in order to obtain this thickness of 90 μm on the finished coating.

This arrangement represents substantial time and cost savings of the method of the present disclosure compared with the prior art methods.

Preferably, the temperature (° C.) and the period during which the annealing step is applied are determined so that said sacrificial corrosion-protective coating comprises, relative to its total weight, less than 10% by weight, preferably less than 5% by weight of a hydrocarbon residue.

Preferably, the application step (ii) comprises a step of spraying or sprinkling the pigmented aqueous binder composition according to embodiments of the present disclosure, more preferably a spraying step.

Preferably, the drying step (iii) comprises exposing the support to a temperature in the range 80° C. to 90° C. for at least 5 min, more preferably for at least 20 min and at most 10 h, preferably at most 2 h.

Preferably, the final annealing (vi) or intermediate annealing (v) step is carried out at a temperature greater than or equal to 250° C., in particular at less than or equal to 500° C., more preferably at greater than or equal to 285° C., and in particular less than or equal to 480° C., for at least thirty minutes, preferably at least 45 min, more preferably at least 2 h, still more preferably at least 15 h, still more preferably at most 24 h, in particular at most 20 h.

Preferably, if the temperature is greater than or equal to 400° C., the firing time is greater than or equal to 3 h, preferably greater than or equal to 4 h. If the temperature is less than or equal to 300° C., for example less than or equal to 285° C., the annealing time is greater than or equal to 10 h, more preferably greater than or equal to 15 h, more particularly greater than or equal to 20 h.

This step can be used firstly in order to polymerize the organosilane oligomer hydrolyzate and to distribute the metal oxide particles homogeneously relative to the silicon atoms, creating bridges between the silica and said particles, then secondly, the components comprising oxygen and carbon in particular are degraded—carbonized—in order to form a coating mainly comprising silica organized with the metallic particles in the thickness of said coating. Preferably, this step can be used to form a coating comprising metallic particles and silica, and less than 10% by weight, preferably less than 5% by weight of a hydrocarbon residue in particular obtained from the degradation of said hydrocarbon oligomer, said coating preferably being free from chromium compounds, more preferably free from borates and molybdates.

Thus, at least 90% of the weight of said coating, preferably at least 95% of its weight, is comprised by metallic particles, in particular particles of aluminum and/or zinc and/or magnesium, preferably aluminum and/or zinc.

In a variation, the preparation step (i) comprises a step of sanding said at least one surface portion such that said surface portion has a rough surface, preferably with a surface roughness of less than 100 µm, and more than 1 µm, more preferably in the range 2 µm to 3 µm.

The surface roughness can be measured in accordance with NF EN ISO standard 8503 dated April 2012.

Preferably, the sanding step comprises blasting particles, in particular corundum, with a grain size of 120 US mesh or less, preferably 100 US mesh or less, and more preferably 80 US mesh or less, at a pressure of 200 kPa or more, more preferably 300 kPa or more.

In a variation, the pH of the aqueous binder composition applied to the substrate during step (ii) is adjusted to between 2 and 4, preferably at a temperature in the range 15° C. to 40° C., and more preferably at a temperature in the range 15° C. to 30° C., more particularly in the range 20° C. to 30° C.

In a variation, the pH is adjusted with the aid of an acid selected from the group constituted by p-toluene sulfonic acid, phosphoric acid, boric acid, acetic acid, and mixtures thereof, preferably p-toluene sulfonic acid, phosphoric acid, and acetic acid; more preferably p-toluene sulfonic acid (p-TSA).

In a variation, the pigmentation step consisting in adding particles of at least one metal oxide to the aqueous binder composition and at least one metallic phosphate, in particular in the form of a metallic powder so as to obtain the pigmented binder composition used in step (ii), is carried out with stirring for at least one minute, preferably for at least 15 min with stirring, more preferably at least 30 min with stirring, at a temperature in the range 15° C. to 40° C., preferably in the range 15° C. to 30° C., more particularly in the range 20° C. to 30° C.

In a variation, the step of application of the binder composition (ii) comprises spraying said composition onto said at least one surface portion of the support so as to form a layer of a film, in the moist condition, with a thickness greater than or equal to 25 µm and less than or equal to 200 µm, preferably greater than or equal to 30 µm and less than or equal to 185 µm, more preferably greater than or equal to 60 µm, more particularly less than or equal to 140 µm.

The thickness can be measured using NF EN ISO standard 2808, for example with the aid of an instrument marketed under the trade name POSITECTOR 6000® using the principles of magnetic currents and eddy currents to measure the thickness of the coating on ferrous and non-ferrous metals.

In a variation, the application step (ii) is carried out at the earliest 30 min after the pigmentation step consisting in adding the particles of at least one metal oxide and at least one metallic phosphate to the aqueous composition, in particular zinc phosphate or aluminum tripolyphosphate.

In a fifth aspect, the present disclosure provides a support formed from a material selected from metals, metal alloys and composite materials comprising a metal or a metal alloy, preferably formed from iron and an alloy comprising iron, with at least a portion of a surface being coated with a sacrificial corrosion-protective coating obtained by carrying out the method in accordance with any of the variant embodiments described above and comprising metallic particles, phosphorus and silica, and less than 10% by weight relative to its total weight, preferably less than 5% by weight relative to its total weight of a hydrocarbon residue, said coating preferably being free of chromium compounds, more preferably being free of borates and molybdates.

In the context of the present disclosure, the term "hydrocarbon residue" means any residue comprising carbon and oxygen.

In a variation, the coating has an electrical surface resistivity of less than 1 ohm/square.

In the context of the present disclosure, the electrical resistivity may be measured using a multimeter, or again in accordance with ASTM standard D 257-07 dated 2007 and entitled "Standard test methods of DC resistance or conductance of insulating materials". Preferably, 1 square is of the order of 2.6 square centimeters ($cm^2$).

The electrical surface resistivity of a sacrificial corrosion-protective coating is determined by measuring the capacity of said coating to conduct an electric current. Its reciprocal corresponds to the conductivity (=1/resistivity). When the measured resistivity is low, said coating is a good electrical conductor. In contrast, when its resistivity is high, the coating is a good electrical insulator.

DETAILED DESCRIPTION OF EXEMPLARY EMBODIMENTS

The present invention can be better understood from the following non-limiting exemplary embodiments.

I—Examples of Formulations for a Binder Composition in Accordance with Embodiments of the Present Disclosure Comprising at Least One Metallic Phosphate

Example 1

Preparation of Part a of a Kit According to Embodiments of the Present Disclosure Starting from the Following Compounds an organosilane oligomer derived from gamma-glycidoxypropyltrimethoxysilane ($C_9H_{20}O_5Si$): in the range 20 g to 40 g;

demineralized water: in the range 60 milliliters (mL) to 80 mL.

The pH of part A was adjusted to in the range 2 to 3 with the aid of p-TSA acid.

Preparation of Part B of the Kit According to Embodiments of the Present Disclosure Starting from the Following Compounds metal oxide powder based on aluminum with or without zinc: in the range 5 g to 65 g;
zinc phosphate.

In the range 25 g to 45 g of part A was mixed with part B to form an aqueous binder composition. The proportion by weight of particles of at least one metal oxide in the mixture of parts A and B was greater than or equal to 75% relative to the total dry weight of the aqueous composition. The proportion by weight of said zinc phosphate relative to the total dry weight of the aqueous composition was in the range 3% to 8%, limits included.

After pigmentation of part A, the pH was again adjusted; in this particular example, the pH was in the range 2 to 3.

Example 2 was strictly identical to Example 1, with the exception that the zinc phosphate was replaced by aluminum tripolyphosphate.

Example 3

Preparation of Part a of a Kit According to Embodiments of the Present Disclosure Starting from the Following Compounds an organosilane oligomer derived from trimethoxyvinylsilane ($C_5H_{12}O_3Si$): in the range 10 g to 30 g;
demineralized water: in the range 60 mL to 80 mL.

The pH of part A was adjusted to between 2 and 3 with the aid of p-TSA acid.

Preparation of Part B of the Kit According to Embodiments of the Present Disclosure Starting from the Following Compounds metal oxide powder based on aluminum with or without zinc: 45-65 g;
zinc phosphate.

In the range 35 g to 55 g of part A was mixed with part B. The proportion by weight of particles of at least one metal oxide in the mixture of parts A and B was greater than or equal to 75% relative to the total dry weight of the aqueous composition. The proportion by weight of said zinc phosphate relative to the total dry weight of the aqueous composition was in the range 3% to 8%, limits included.

After pigmentation of part A, the pH was again adjusted; in this precise example, the pH was in the range 2 to 3.

Example 4 was strictly identical to Example 3, with the exception that the zinc phosphate was replaced by aluminum tripolyphosphate.

II—Preparation of a Control Support Using a Prior Art Method

The surface of a steel support was coated with a sacrificial corrosion-protective coating by carrying out a prior art chromating method, in particular based on chromium VI. The support obtained was termed a prior art control.

This support initially underwent a first step of preparing its surface; in particular, the surface was degreased with a basic degreaser such as that marketed by Henkel with reference TURCO 5948 DMP.

The surface was then rinsed with demineralized water and dried with an air blower. The surface was thus ready for sanding, in particular using particles of white corundum with a grain size of the order of 80 µm at a spray pressure for said particles of the order of 300 kPa in order to obtain a surface roughness of 2 µm to 3 µm thickness.

The prior art aqueous binder composition was stirred for 24 h before use, then filtered through a stainless steel screen with openings of the order of 0.025 millimeters (mm). The composition was stirred again just before it was applied in two successive layers. The mean thickness of a compacted layer was thus 25 µm. The support coated with a layer of binder composition was dried at a temperature of 80° C. for 15 min. The layer then changed from a green color to a gray color. The maximum time between this drying step and the annealing step was a maximum of 30 min. Thus, almost immediately after drying, the coated support was exposed to an intermediate annealing operation at 285° C. for a minimum of 3 h for each applied layer (intermediate annealing after application of each layer) or at 215° C. for a minimum of 20 h if the support had been cadmium-coated or 285° C. for 5 h for a final anneal. Each layer was compacted during an intermediate or final compacting step by blasting corundum with dimensions in the range 90-180 US mesh and applying a pressure of 1 kPa to 150 kPa.

III—Preparation of a Steel Support Using the Method Described Below, and Examples 1 to 4 of Pigmented Binder Compositions Described in Paragraph I A steel support was prepared by carrying out the same operations as for the control support: the only difference was that different sanding operation parameters were used in which the particles were blasted at a pressure of 300 kPa to 400 kPa and had larger dimensions, since they were less than or equal to 80 US mesh. Furthermore, no intermediate annealing step and no intermediate compacting steps were carried out.

Activated part A from any one of Examples 1 to 4, i.e. with a pH in the range 2 to 3, was then mixed with a metallic paste (part B from any one of Examples 1 to 4) for 20 min to form an activated aqueous binder composition in accordance with any one of Examples 1 to 4, which was then filtered through a screen with openings of the order of 0.12 mm.

The activated and pigmented binder composition of Examples 1 to 4 was stirred just before it was applied. The binder composition of any one of Examples 1 to 4 was applied in a single layer of moist film, for example 25 µm to 200 µm thick, depending on the low pressure pneumatic spray specifications, i.e., preferably at a pressure in the range 150 kPa to 200 kPa, in 2 to 6 crossed layers.

For complex parts, it is possible to apply the binder composition in a plurality of layers.

The coated support then underwent a drying step (ii) or stoving step during which it was exposed, for example, to a temperature of the order of 90° C. for at least 60 min in order to change the color of the layer from dark gray to pale gray.

The coated support then underwent a final annealing step (vi) during which it was exposed to a temperature of 420° C. for 4 h or 285° C. for 20 h. The coating formed at the surface of the support was finally compacted during the final compacting step (vii) by spraying corundum with dimensions in the range 80 to 180 US mesh, limits included, at a pressure of approximately 200 kPa or more.

Table I below summarizes the results of the tests carried out on the support obtained in accordance with the method described above in paragraph III; the results were the same for all of the aqueous binder compositions.

TABLE 1

| TESTS | STANDARDS | REQUIREMENTS | RESULTS |
|---|---|---|---|
| Application | | Continuous and uniform visual appearance | Continuous and uniform visual appearance |
| Final thickness | NF EN ISO 2808 | 25 μm to 90 μm | 25 μm to 90 μm |
| Corrosion, appearance of red rust | NF ISO 9227-2012 | 1000 h | The red rust appeared in the damaged test coatings after more than 1200 h. With no damage, the red rust appeared after more than 2500 h |
| Adhesion | NF ISO 2409 | Class 0 or 1 | Class 0 |
| Hardness | NF ISO 1518 | >2500 g before immersion | >2500 g before immersion |
| Behavior as regards contaminants | NF ISO 2409 NF ISO 1518 | Specific to each fluid | Skydrol: Class 0 >2400 g after immersion |
| Behavior - moisture | NF ISO 2409 NF ISO 1518 | 10 cycles | After 10 cycles Adhesion: class 0 Hardness: >2400 g |
| Behavior-temperature variations | NF ISO 2409 NF ISO 1518 | 100 cycles | After 100 cycles Adhesion: class 0 Hardness: >2400 g |
| Temperature corrosion | NF ISO 9227-2012 | 20 (A) cycles 25 (B) cycles 20 (C) cycles | No blisters were formed on test specimens, nor red rust, since the test coatings remained intact. |
| Conductivity test | ASTM Standard D 257-07 (2007): "Standard Test Method for DC resistance or conductance of insulating materials". | R <15 Ohms/square | R <1 Ohm/square |

20 (A) cycles, where each cycle (A) comprised, in succession: a first cycle of 6 h at 450° C., a second cycle of 1 h remaining in a vessel held at 35° C., a third cycle of 16 h under salt spray, a fourth cycle identical to the third cycle.
25 (B) cycles, where each cycle (B) was identical to cycle (A) with the exception that the temperature of the first cycle was 400° C.
20 (C) cycles, where each cycle (C) was identical to cycle (A) with the exception that the temperature of the first cycle was 550° C.

Concerning corrosion to form red rust, the tests were carried out in salt spray on specimens with or without damage, the damage being a scratch in the form of a cross made in the coating to be tested, which coating had thickness in the range 40 μm to 60 μm.

The salt spray and its conditions for application are defined in ISO standard 9227-2012.

IV—Comparative Examples of Aqueous Binder Compositions without Metallic Phosphate Two binder compositions with references 5 and 6, respectively corresponding to the binder composition examples 1 and 2, were prepared, each time without metallic phosphate.

Concerning the corrosion test until red rust appeared, red rust was observed to appear in the damage at approximately 500 h. Without damage, red rust only appeared at approximately 1000 h. These results were obtained for the two binder compositions 5 and 6.

Concerning the temperature corrosion test, the formation of blisters was observed after 5 cycles in the three cases (A), (B) and (C) for both binder compositions 5 and 6.

In conclusion, adding at least one metallic phosphate, in particular zinc phosphate or aluminum tripolyphosphate, can double the salt spray resistance of the coating according to embodiments of the present disclosure including damage in comparison with coatings that are free of metallic phosphate.

With no scratching of the specimens, after 2500 h of exposure to salt spray, the test specimens exhibited neither pitting linked to corrosion, nor blisters. Adding at least one metallic phosphate, in particular zinc phosphate or aluminum tripolyphosphate, thus doubled the salt spray resistance of the undamaged sacrificial protective coatings according to embodiments of the present disclosure.

Adding at least one metallic phosphate, in particular zinc phosphate or aluminum tripolyphosphate, can thus very significantly improve the electrochemical activity of the sacrificial corrosion-protective coating as well as the salt spray and temperature corrosion resistance.

Prepared samples as described in paragraph III and comprising binder composition 5 exemplified above were tested at various stages of the method of the present disclosure:

1) sample 1, heat treatment 1 h at 90° C., corresponding to the evaporation step (v);
2) sample 2, 1 h at 90° C. then 4 h at 420° C., corresponding to steps (v) and (vi);
3) sample 3, 1 h at 90° C. then 4 h at 420° C., corresponding to steps (v) and (vi) followed by compacting at a pressure of 4 (metric) tonnes (t) for 1 min.

Analysis of samples 1-3 was carried out with a MagiX wavelength dispersion X-ray fluorescence spectrometer from Philips.

In order to carry out X-ray fluorescence analysis, the samples need to be compacted, either pure or with a binder, and the total mass of the pellet must be 200 milligrams (mg) for 13 mm diameter pellets. The three samples were thus each prepared by mixing 100 mg of the example binder composition to be analyzed with 100 mg of boric acid. Each mixture was then compacted under a pressure of 4 t for 1 min in order to obtain 13 mm diameter pellets. Analysis of these pellets was carried out under vacuum (5 Pascals).

The results of the semi-quantitative analyses are indicated in Table 2 below. They are expressed as the percentages by weight. The method can be used to detect elements from boron to uranium. However, given that the presence of boric acid means that oxygen cannot be assayed and in the light of the nature of the samples (metallic appearance), the results are presented without the oxygen values. Carbon was detected in sample 1, but no signal was observed in the other two samples 2 and 3.

Conversion of the pigmented binder composition was close to 100% since no carbon was detected using X-ray fluorescence in the films after curing (step (v)).

If one of the binder compositions 1 to 4 had been tested, Table 2 would have shown the phosphorus and the metal obtained from said at least one metallic phosphate, in particular zinc or aluminum, which would have been added to the metallic particles.

TABLE 2

| Sample 1 | C | Al | Si | Zn |
|---|---|---|---|---|
| Concentrations | 15.5 | 81.9 | 2.33 | 0.02 |
| Sample 2 | | Al | Si | Zn |
| Concentrations | — | 97.2 | 2.43 | 0.02 |

TABLE 2-continued

| Sample 3 Concentrations | — | Al 97.4 | Si 2.14 | Zn 0.07 |
|---|---|---|---|---|

Advantageously, the combination of the method of the present disclosure and the binder composition according to embodiments of the present disclosure means that a sacrificial corrosion-protective coating can be formed in which the matrix is essentially formed by silica, metallic particles, and at least one metallic phosphate having high-temperature corrosion resistance properties (at 400° C. or higher) and salt spray corrosion resistance properties as defined in ISO standard 9227 with or without damage being present, which properties are doubled compared with a sacrificial protective coating that is free of at least one metallic phosphate.

Where any standards of national, international, or other standards body are referenced (e.g., ISO, NF, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure. The true scope of the disclosure is indicated by the following claims.

The invention claimed is:

1. An aqueous binder composition for manufacturing a sacrificial corrosion-protective coating, said composition being free of chromates, wherein said aqueous binder composition has a pH of less than 6 and comprises a binder, particles of at least one metal oxide, and at least one metallic phosphate, said binder comprising a hydrolyzed organosilane oligomer, and wherein the proportion by weight of said particles of at least one metal oxide relative to the total dry weight of said aqueous binder composition is greater than or equal to 75%.

2. The aqueous binder composition according to claim 1, wherein said at least one metal oxide is selected from the group consisting of aluminum oxide, zinc oxide, a mixed zinc-magnesium oxide, a mixed aluminum-zinc oxide, and mixtures thereof.

3. The aqueous binder composition according to claim 1, wherein the hydrolyzed organosilane oligomer represents in the range 5% to 30% by weight of the total dry weight of said aqueous binder composition.

4. The aqueous binder composition according to claim 1, wherein said aqueous binder composition comprises an acidic catalyst selected from the group consisting of p-toluene sulfonic acid, phosphoric acid, boric acid, acetic acid, and mixtures thereof.

5. The aqueous binder composition according to claim 1, wherein the particles of the at least one metal oxide have a granulometric distribution for 10% to 90% by weight of said particles in the range of 2 μm to 30 μm.

6. The aqueous binder composition according to claim 1, wherein said composition is free of borates and molybdates.

7. The aqueous binder composition according to claim 1, wherein the hydrolyzed organosilane oligomer is selected from: an epoxy dialkoxysilane, an epoxy trialkoxysilane, a vinyldialkoxysilane, or a vinyl trialkoxysilane.

8. The aqueous binder composition according to claim 1, wherein the hydrolyzed organosilane oligomer represents in the range 5% to 15% by weight of the total dry weight of said aqueous binder composition.

9. The aqueous binder composition according to claim 1, wherein said at least one metallic phosphate is selected from the group consisting of zinc phosphate ($Zn_3(PO_4)_2$), manganese phosphate ($Mn_3(PO_4)_2$), aluminum phosphate ($Al_5PO_4$), aluminum tripolyphosphate ($Al_5(P_3O_{10})_3$), aluminum and zinc phosphate, and mixtures thereof.

10. The aqueous binder composition according to claim 9, wherein said at least one metallic phosphate is selected from the group consisting of zinc phosphate ($Zn_3(PO_4)_2$), aluminum tripolyphosphate ($Al_5(P_3O_{10})_3$), and mixtures thereof.

11. The aqueous binder composition according to claim 1, wherein the proportion by weight of the particles of the at least one metal oxide is greater than or equal to 80% relative to the total dry weight of said aqueous binder composition.

12. The aqueous binder composition according to claim 11, wherein the proportion by weight of the particles of the at least one metal oxide is greater than or equal to 85% relative to the total dry weight of said aqueous binder composition.

13. The aqueous binder composition according to claim 1, wherein the proportion by weight of the at least one metallic phosphate is more than 1 and less than or equal to 15% relative to the total dry weight of said aqueous binder composition.

14. The aqueous binder composition according to claim 13, wherein the proportion by weight of the at least one metallic phosphate is greater than or equal to 3% and less than or equal to 10%, relative to the total dry weight of said aqueous binder composition.

15. The aqueous binder composition according to claim 1, wherein said organosilane oligomer has the following formula (I), $[R_4-(SiR_1R_2R_3)]_n$, in which n is an integer with $2 \leq n \leq 100$ and R4 is a non-hydrolyzable group, and wherein at least one group from R1, R2, and R3 is a hydrolyzable group.

16. The aqueous binder composition according to claim 15, wherein R4 represents a non-hydrolyzable group selected from: a C1-C20 alkyl group or C3-C10 cycloalkyl group substituted with one or more epoxy group(s), said epoxy(s) group being mono, di, tri or tetravalent; a glycidoxy group; a C1-C20 alkyl group substituted with a glycidoxy group; a vinyl group (CH2=CH—); a C1-C20 alkyl group substituted with a vinyl group (CH2=CH—); a C1-C20 alkyl group substituted with a primary amine and/or a secondary amine and/or a tertiary amine; a primary amine; a secondary amine; a tertiary amine; a C1-C20 alkyl group substituted with a thiol group; a thiol group; a urea group; a C1-C20 alkyl group substituted with a urea group; an isocyanate group; or a C1-C20 alkyl group substituted with an isocyanate group; and wherein at least one of R1, R2, or R3 represents, as the hydrolyzable group, a C1-C10 alkoxy group; a C3-C10 cycloalkyloxy group; a C5-C10 aryloxy group, or a C1-C5 acyloxy group.

17. The aqueous binder composition according to claim 16, wherein at least one of R1, R2, or R3 represents a non-hydrolyzable group selected from: a C1-C20 alkyl group or C3-C10 cycloalkyl group substituted with one or more epoxy group(s), said epoxy(s) group being mono, di, tri or tetravalent; a glycidoxy group; a C1-C20 alkyl group substituted with a glycidoxy group; a vinyl group (CH2=CH—); a C1-C20 alkyl group substituted with a vinyl group (CH2=CH—); a C1-C20 alkyl group substituted with a primary amine and/or a secondary amine and/or a tertiary amine; a primary amine; a secondary amine; a tertiary amine; a C1-C20 alkyl group substituted with a thiol group; a thiol group; a urea group; a C1-C20 alkyl group substituted with a urea group; an isocyanate group; or a C1-C20 alkyl group substituted with an isocyanate group.

18. The aqueous binder composition according to claim 15, wherein $R_4$—$(SiR_1R_2R_3)$ of the organosilane oligomer with formula (I) is selected from a list (IIa): gamma-glycidoxypropyltrimethoxysilane; gamma-glycidoxypropyltriethoxysilane; gamma-glycidoxypropyl; methyldimethoxysilane; and gamma-glycidoxypropylmethyldiethoxysilane.

19. The aqueous binder composition according to claim 18, wherein the $R_4$—$(SiR_1R_2R_3)$ of the organosilane oligomer with formula (I) is selected from a list (IIb): beta-(3,4-epoxycyclohexyl)-ethyl trimethoxysiloxane; beta-(3,4-epoxycyclohexyl)-ethyl methyl dimethoxysilane, beta-(3,4-epoxycyclohexyl)ethyl methyl diethoxysilane; and beta-(3,4-epoxycyclohexyl)-ethyltriethoxysilane.

* * * * *